United States Patent
Pawlak

(10) Patent No.: US 8,729,408 B2
(45) Date of Patent: May 20, 2014

(54) MOULDING TO CONCEAL WIRING

(76) Inventor: Dennis J. Pawlak, St. Louis, MO (US)

( * ) Notice: Subject to any disclaimer, the term of this patent is extended or adjusted under 35 U.S.C. 154(b) by 311 days.

(21) Appl. No.: 12/913,926

(22) Filed: Oct. 28, 2010

(65) Prior Publication Data

US 2011/0108318 A1 May 12, 2011

Related U.S. Application Data

(60) Provisional application No. 61/259,721, filed on Nov. 10, 2009.

(51) Int. Cl.
*H02G 3/08* (2006.01)
*F16L 3/22* (2006.01)
*E04C 2/52* (2006.01)

(52) U.S. Cl.
USPC ................... 174/504; 248/68.1; 52/220.5

(58) Field of Classification Search
CPC .......... H02G 3/0431; H02G 3/08; F16L 3/22; F16L 3/2235; E04B 5/48; E04C 2/52
USPC ......... D13/155; D25/136; 248/64, 68.1, 74.3, 248/227.4, 228.3, 228.7; 174/68.1, 68.3, 174/72 A, 72 C, 97, 99 R, 101, 504, 505, 64, 174/70 C, 95, 96, 109, 117 A, 135, 481, 495, 174/496, 506; 52/220.5, 220.7, 282.5, 52/287.1, 716.1, 220.3, 220.8, 290, 52/717.01, 717.03; 138/105, 156, 161, 138/163, 165, 166, 167; 439/371, 501
See application file for complete search history.

(56) References Cited

U.S. PATENT DOCUMENTS

| | | | | |
|---|---|---|---|---|
| 1,794,102 A | | 2/1931 | Comins | |
| 1,972,545 A | * | 9/1934 | Warren | ...................... 52/717.03 |
| 3,161,926 A | * | 12/1964 | Schaub | ........................ 52/288.1 |
| 3,262,083 A | * | 7/1966 | Gooding | ........................ 174/504 |
| 3,622,686 A | | 11/1971 | Neirinck | |
| 3,659,319 A | * | 5/1972 | Erickson | .................... 248/205.3 |
| 3,676,974 A | | 7/1972 | Daly | |
| 3,721,762 A | | 3/1973 | Gooding | |
| 3,786,171 A | * | 1/1974 | Shira | ............................. 174/504 |
| 3,991,960 A | * | 11/1976 | Tanaka | ......................... 248/68.1 |

(Continued)

OTHER PUBLICATIONS

Definition provided from www.thefreedictionary.com for "bias" Jun. 18, 2013.*

(Continued)

*Primary Examiner* — Chau N Nguyen
*Assistant Examiner* — Roshn Varghese
(74) *Attorney, Agent, or Firm* — Charles McCloskey

(57) ABSTRACT

Moulding to conceal wiring has at least one piece, a cavity within the piece and a resilient flap for the cavity. The cavity and the flap extend for the length of the moulding. The moulding has a major piece that receives a minor piece. The major piece has a top portion upon a stem above a base portion. The top portion has a contour of architectural form. The top portion has cladding over it and nearly half way down the stem. The base portion has a keyway for the minor portion. The minor piece has a tongue with cladding upon it and that extends for half of the cavity. The cladding of the top portion has a free end that extends inside of the tongue. The free end deflects into the cavity for wire insertion but resiliently closes against the tongue. Alternatively, the invention has single piece construction.

4 Claims, 4 Drawing Sheets

(56) References Cited

U.S. PATENT DOCUMENTS

| | | | | |
|---|---|---|---|---|
| 4,023,758 A | * | 5/1977 | Yuda | 248/73 |
| 4,094,561 A | * | 6/1978 | Wolff et al. | 439/209 |
| 4,156,795 A | | 5/1979 | Lacan | |
| 4,165,577 A | * | 8/1979 | Shanahan et al. | 52/288.1 |
| 4,332,429 A | * | 6/1982 | Frick et al. | 174/495 |
| 4,423,284 A | | 12/1983 | Kaplan | |
| 4,454,374 A | * | 6/1984 | Pollack | 174/68.3 |
| 4,530,865 A | * | 7/1985 | Sprenger | 174/117 A |
| 4,614,838 A | | 9/1986 | Sandstrom | |
| 4,622,791 A | * | 11/1986 | Cook et al. | 52/241 |
| 4,937,400 A | * | 6/1990 | Williams | 174/95 |
| 5,274,972 A | | 1/1994 | Hansen | |
| D371,343 S | | 7/1996 | Loftus | |
| 5,553,431 A | * | 9/1996 | Pelosi et al. | 52/287.1 |
| 5,694,726 A | | 12/1997 | Wu | |
| 5,979,132 A | * | 11/1999 | Margarit | 52/312 |
| 6,021,619 A | * | 2/2000 | M.ang.nsson | 52/716.1 |
| 6,191,363 B1 | | 2/2001 | Samuels | |
| 6,202,380 B1 | * | 3/2001 | Trutwin et al. | 174/504 |
| 6,332,479 B1 | * | 12/2001 | Ko | 174/68.3 |
| 6,504,098 B2 | | 1/2003 | Seamans | |
| 7,514,631 B2 | * | 4/2009 | Martin et al. | 174/97 |
| 7,574,836 B2 | | 8/2009 | Wesolowska | |

OTHER PUBLICATIONS

Definition provided from www.thefreedictionary.com for "against" Jun. 18, 2013.*

Pawlak, Dennis J., Hideaway Trim flyer, Jan. 2013, p. 1, v. 1, Pawlak, Dennis J., St. Louis, MO, USA.

Pawlak, Dennis J., photo of van showing invention, 2013, p. n/a, v. n/a, Pawlak, Dennis J., St. Louis, MO, USA.

* cited by examiner

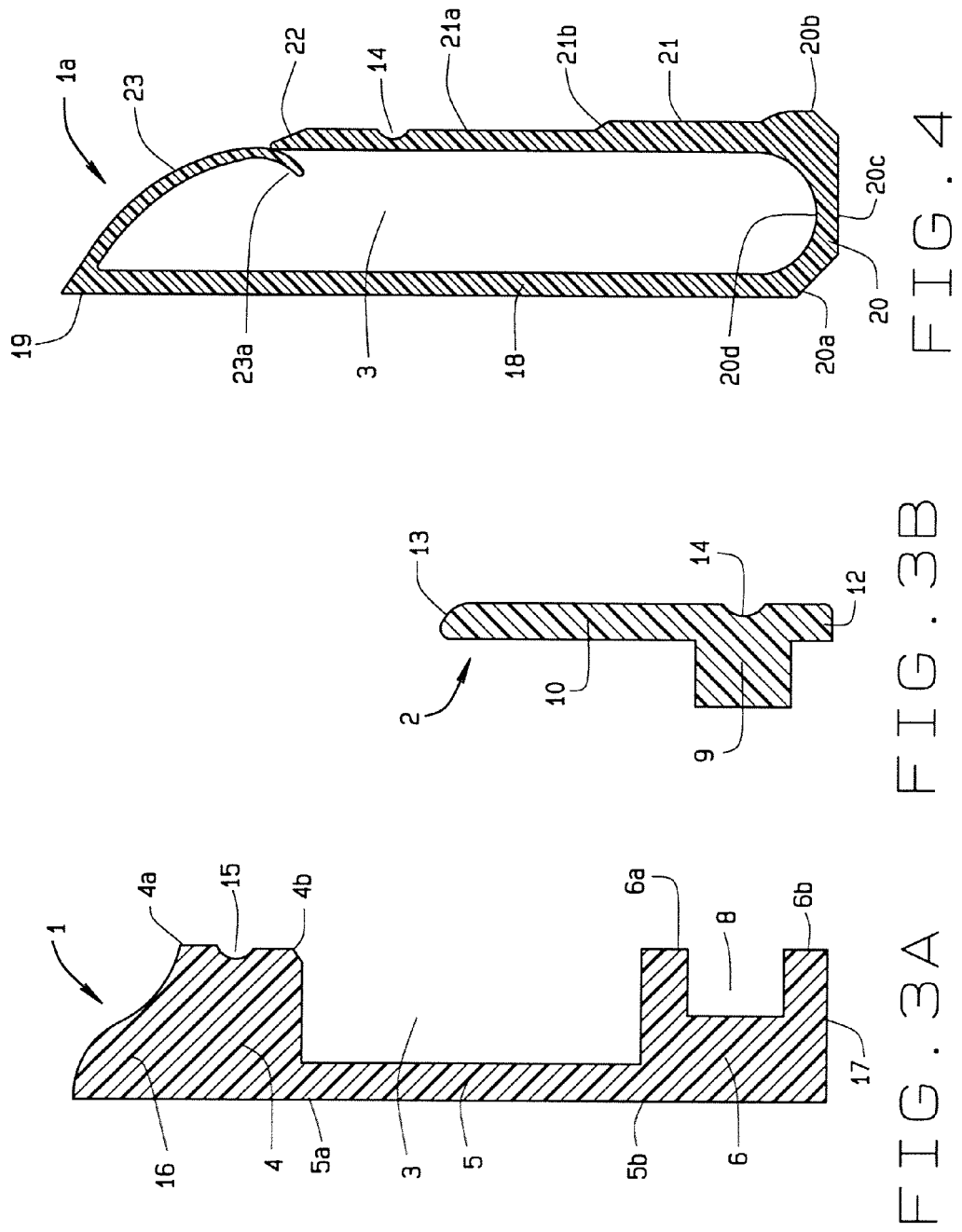

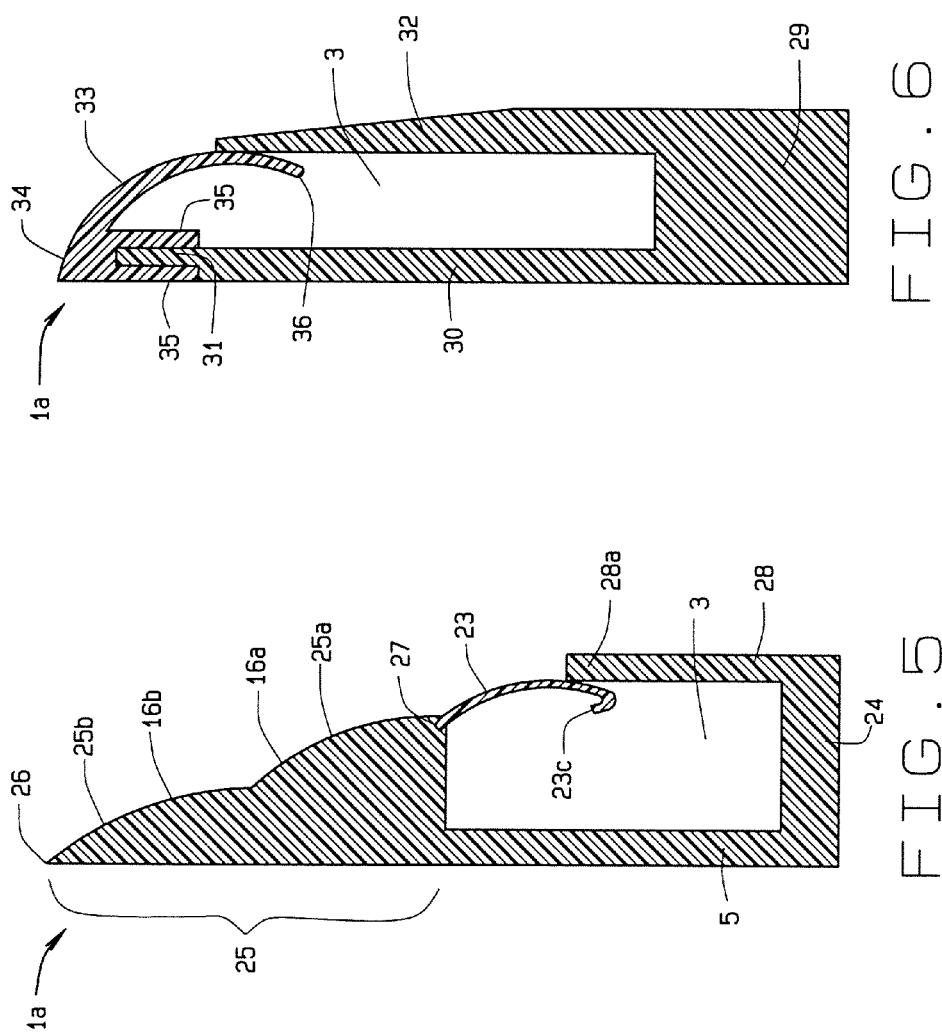

MOULDING TO CONCEAL WIRING

CROSS-REFERENCE TO RELATED APPLICATION

This non-provisional application claims priority to the pending provisional application 61/259,721 filed on Nov. 10, 2009 which is owned by the same inventor.

BACKGROUND OF THE INVENTION

The moulding to conceal wiring generally relates to trim and more specifically to hollow moulding. The invention relates to concealing wires within installed trim pieces, or moulding, at any point upon the length of the moulding. The invention provides floor trim with a small flexible opening on the front surface that receives wiring and then conceals it within the trim.

Contractors generally construct buildings with walls at right angles to floors and ceilings. This construction makes for a sound structure that supports various loads and stands for many decades. Right angle corners though may lose their appeal to the eye of people that live or work within a building.

For many decades, contractors have dress up right angle corners with various pieces of moulding. The moulding generally spans the intersection between a wall and a ceiling or a wall and a floor. Moulding at the wall and ceiling generally has the name of crown moulding while moulding at the wall and floor goes by base moulding. Contractors generally install base moulding in most structures but crown moulding puts a touch of class in rooms and so has less installation. Where the base moulding meets a corner or a doorway, the installer supplies various miters and copes so the moulding transitions in its direction. Also, various kits provide premade corner pieces so that installers cut sections of moulding to length between the corner pieces, avoiding the need for miters and copes.

Homeowners, office workers, and contractors also install wiring for many purposes including delivery of electrical power, stereo system signals to speakers, cable television lines, and computer networks to name a few. Before the finish walls go up, contractors can run wiring through the wall structure and then conceal it behind finish walls, such as drywall. Once the drywall installs upon the wall structure, running wire becomes more difficult and labor intensive. Homeowners, office workers, and contractors though do run wiring upon the exterior of walls. The wiring passes through various conduits that attach to the surface of a wall, optionally as in drywall construction, or required as in masonry construction. Some homeowners become adept at running conduit, however skilled contracts generally install the conduit and run the wire through it. Office workers may run wiring through various tubes or other concealing devices. The concealed wiring generally has a limit by the length of the power cords for equipment. The shortest cord generally governs placement of equipment. In other offices, workers generally leave the wiring exposed which may look unsightly or cause tripping.

DESCRIPTION OF THE PRIOR ART

Over the years, various conduits and base mouldings have sought to conceal wiring without having to run the wiring through a wall. The conduits and mouldings attach to the wall and may run horizontally, vertically, or both. Such installed conduits and mouldings do stand out from the wall both physically and aesthetically. The conduits and prior art mouldings may appear unsightly or encounter damage from homeowners or office workers. The prior art generally receives wiring at an end that an installer pulls through connected conduit. However in offices and select rooms of a house, equipment and layout may call for access to wiring not at an end of conduit but at an intermediate position along the length of the conduit or wall.

The prior art has sought various means of inserting wiring in conduit at the ends and in some cases intermediate locations. The Comins, to U.S. Pat. No. 1,794,102 describes a conduit for electric wires. This patent shows insertion of wire at any point on the length of the conduit. This device has sheet metal formed into a curved top over a curved bottom. The top may contact the edge of the bottom or it may be spaced away from the edge as shown. This device generally remains separate from moulding where the moulding is below the device. This patent does not show wire containment integrated with a length of moulding as in the present invention.

The Shanahan, to U.S. Pat. No. 4,165,577 describes an insect trap made into an electrified baseboard. The baseboard has two electrical conductors. The conductors extend for the length of the baseboard and generally within a cavity bounded by an inverted cover that has an edge spaced above a floor. This patent does not mention insertion of the conductor along the length of the baseboard as in your invention. This patent has a cover that snaps upon a base. This patent may show an architectural appearance, however the lower portion of the baseboard remains open for insects to enter.

The Mansson, to U.S. Pat. No. 6,021,619 describes channel moulding of two pieces. The moulding does achieve an architectural cross section similar to your invention. The moulding includes an internal cavity, or channel, in its length that receives and carries wires inside the moulding. A second cap closes the channel or cavity along the length of the moulding. The second cap can be removed for inserting wires. The present invention, when assembled, has a resilient free end of the cladding that allows insertion of wires, however, the cladding remains joined to the moulding.

The Neirinck, to U.S. Pat. No. 3,622,686 shows a conduit for housing wires along its length for automotive conduit. The conduit has an outer wall with a free end and two inner walls that form a cavity. The outer wall allows for insertion of wires along the length of the conduit while the cavity does not except at select openings. The conduit lacks architectural moulding shape and the outer wall does not permit access along its entire length to the cavity.

The Gooding, to U.S. Pat. No. 3,721,762 illustrates a two piece raceway that has a clip mounted to a wall and a cover that snaps upon the clip. Wires run in channels for the length of the clip. However, the solid cover does not permit insertion of wires along its length as in the present invention.

The Daly, to U.S. Pat. No. 3,676,974 shows another baseboard moulding system to conceal wall outlets. This patent primarily shows a cover sized and located to conceal an outlet. The patent also provides moulding of similar cross section to the cover extending outwardly from the cover. However, the patent does not show wiring running behind the moulding. The outlets appear wired into a wall.

The Shira, to U.S. Pat. No. 3,786,171 has a hinged raceway for wiring. This raceway has an apparent architectural cross section similar to base moulding. This patent shows a back member connecting to a cover upon a hinge. The hinge extends for the length of the back member and the cover. The hinge has a different material consistency than the back and cover so that it rotates.

The Lacan, to U.S. Pat. No. 4,156,795 illustrates ductwork that has a main wall that abuts a wall and channels that receive wires along its length. Along with the main wall, this patent includes a cover, or cooperating element, that rotates upon the main wall and compresses wire using its linear knobs, or protuberances, within ribs. The covers have a spacing related to common lengths of wire. Though this invention allows insertion of wire along its length, the cover retains the wire only at select junctions.

The Kaplan, to U.S. Pat. No. 4,423,284 describes a rectangular raceway of two hinged members. The members include a back panel that attaches to a building wall while the opposite front panel retains wires placed therein. The back panel hingedly connects to the front panel along a bead using cooperating legs of each panel. Though your invention may have two pieces, your invention does not have a hinge.

The Sandstrom, to U.S. Pat. No. 4,614,838 also provides grooved edging that receives wires along its length. However, the grooves remain open and visible along the length of the edging while the present invention conceals the wiring within the free end of the cladding.

The Hansen, to U.S. Pat. No. 5,274,972 provides a duct for utility lines that also has a retaining strip that secures to a wall and then a capping member that snaps upon the retaining strip. The capping member may have an architectural shape while the retaining strip has walls that function as shelves for utility lines. This duct though does not permit insertion of wiring through the capping member.

The Wu of Taiwan, to U.S. Pat. No. 5,694,726 describes a fitting assembly of two components, a retainer plate secured to a wall and a casing that connects to the retainer plate. The casing has an architectural shape with a soft extension strip at the bottom. The casing forms a hollow space that retains wiring when secured to the retainer plate. The casing secures upon its entire length to the retainer plate so insertion of wires does not happen unlike the present invention.

Then, Samuels of Canada, to the U.S. Pat. No. 6,191,363 has baseboard moulding that conceals conduit. The moulding has its length assembled from a back plate that mounts to a wall and a front plate. The back plate has many partition walls that serve as tracks for wires and each partition wall ends in deflectable free edges. The front plate has a coupling that extends outwardly and engages teeth in the back plate thus securing the front plate.

The Seamans, to U.S. Pat. No. 6,504,098 provides architectural mouldings that conceal wires. These mouldings have classic architectural shapes but with a cavity behind the installed moulding. Wiring then passes in the cavity when carried by various brackets also behind the moulding. The moulding has its length and often wood construction so wiring may not be inserted as in your invention.

The Wesolowska of Poland, to U.S. Pat. No. 7,574,836 has a skirting board that conceals wiring. The skirting board has a piece of molding that rests upon a tenon of a connecting bracket. The bracket attaches to a wall and has various ledges that support wires. This patent indicates that the molding may be of poly vinyl chloride. Though the molding may flex, insertion of wires requires separating the molding from the bracket unlike the present invention where the cladding remains attached though the free end of the cladding deflects inward to receive wiring.

The design Pat. No. D371,343 to Loftus, shows the appearance of a conduit. This design patent shows a conduit that has a solid bottom with two edges that join at the top of the conduit. The conduit has a large cavity between the edges that accepts wiring. The edges have a defined shape as shown in FIGS. 6, 7. The present invention though has as a flexible free end of cladding that fits behind a more rigid tongue.

The present invention overcomes the disadvantages of the prior art and provides a moulding to conceal wiring that allows an installer to insert wiring at any point upon the length of the moulding. The present invention takes on the unsightly wires and wiring along the baseboards in homes and offices. The present invention allows an installer to hide wires inside of the actual trim where a typical baseboard would run. The present invention allows for insertion and removal of wiring at any point upon the length of a piece of moulding. The present invention also includes splices, joints, inside corners, and outside corners all connected with clips thus removing the chore of miter cuts.

SUMMARY OF THE INVENTION

Generally, the moulding to conceal wiring has at least one stock piece, a cavity inwardly of the stock piece and a resilient flap that covers the cavity. The cavity and the flap extend for the length of the piece of moulding. In the preferred embodiment, the moulding has a major piece that receives a minor piece while providing a cavity for wiring. The major piece has a top portion upon a stem above a base portion. The top portion has an edge in various architectural forms. The stem is narrower than the top portion and connects the two portions. The top portion has cladding that extends over it and beneath the top portion at least half way down the stem. The base portion has a keyway that receives a key of the minor portion. The minor piece has a tongue offset from the key. The tongue has cladding tightly upon it and extends for half of the height of the cavity. The cladding of the top portion has a free end that extends downwardly from the top portion to inside of the tongue. The free end deflects into the cavity for wire insertion but has resiliency to close back against the tongue. A user may insert wire through the free end at any position along a piece of moulding. Alternatively, the invention has single piece construction for receiving the wire along its length then concealing it.

There has thus been outlined, rather broadly, the more important features of the invention in order that the detailed description thereof that follows may be better understood and that the present contribution to the art may be better appreciated. The present invention also includes a main component made as a single piece extrusion that includes a cavity for insertion of wiring, self adhesive tape positioned upon the surface of the major portion, transition pieces of splices or joint clips, inside corners, and outside corners that use thin clips that snap upon the profile of the moulding at joints and corners and remove for insertion of wires, and a free end of a thin flap that allows for insertion and removal of wiring from within the compartment. The adhesive tape, or alternatively adhesive alone, locates upon the back surface of the moulding, particularly the major portion, for its installation upon a wall of a building. The clips cover seams, splices, and corners where two pieces of the moulding connect. The present invention installs in any room and allows an installer to hide or to conceal wiring placed therein. The present invention also fits in and around corners, installs vertically upon walls, and spans upon a ceiling. The present invention has many uses in homes, offices, recording studios, and the like that have extensive wiring and a need to conceal it. Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide wiring concealing moulding that allows for insertion of wiring at any location upon a length of moulding.

Another object is to provide such a wiring concealing moulding that biases a flap in the closed position for a pleasing appearance.

Another object is to provide such wiring concealing moulding that integrates a resilient flap with the remainder of rigid moulding.

Another object is to provide such wiring concealing moulding that has a cavity with sufficient depth and height for two or more wires or cables to run therein.

Another object is to provide such wiring concealing moulding that has a resilient flap joined to one piece of a two piece construction for ready manufacturing.

Another object is to provide such wiring concealing moulding that has cladding upon a rigid material in the cross section of the moulding.

Another object is to provide such wiring concealing moulding that has a single piece construction for ready manufacturing.

Another object is to provide such a wiring concealing moulding that has a low cost of manufacturing so the purchasing contractors, homeowners, office workers, and installers can readily buy the wiring concealing moulding through stores and supply sources.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings,

FIG. 3a provides a section view of the minor portion of the invention while FIG. 3b shows a section view of the major portion of the invention;

FIG. 4 provides an end view of the single piece embodiment of the invention;

FIG. 5 illustrates an end view of an alternate embodiment locating the flap downwardly from the top of the invention;

FIG. 6 describes an end view of an alternate embodiment locating the flop over the top of the invention;

The same reference numerals refer to the same parts throughout the various figures.

Description of the Preferred Embodiment

The present art overcomes the prior art limitations by providing moulding that conceals wiring where the moulding overcomes the limitations of prior devices and methods for running wire outside of a wall. Computer, sound, and video equipment have proliferated bringing with them more wires, cords, and cables. Such wires, cords, and cables become visible and tolerable while a grouping of wires becomes unsightly in home and office settings.

Figure 1:
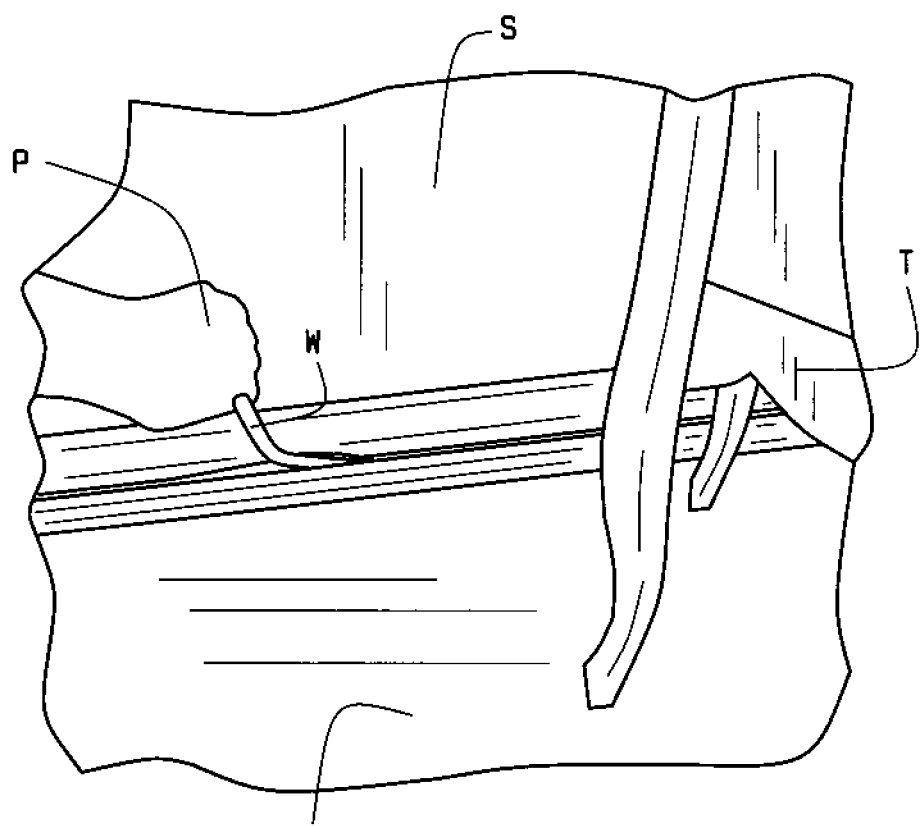
FIG. 1 shows an isometric view of wiring placed within the present invention as installed.

The moulding to conceal wiring, or present invention 1, provides a piece of moulding that receives wiring W inserted at any point along the length of moulding as shown in FIG. 1. The piece of moulding is generally elongated and slender. The moulding 1 attaches to a wall S and abuts a floor F proximate a table T in FIG. 1. The moulding utilizes existing mechanical and adhesive methods for its attachment to the wall. The moulding has an opening along its length that allows a person to place or to insert wiring into the moulding as shown.

Figure 2:
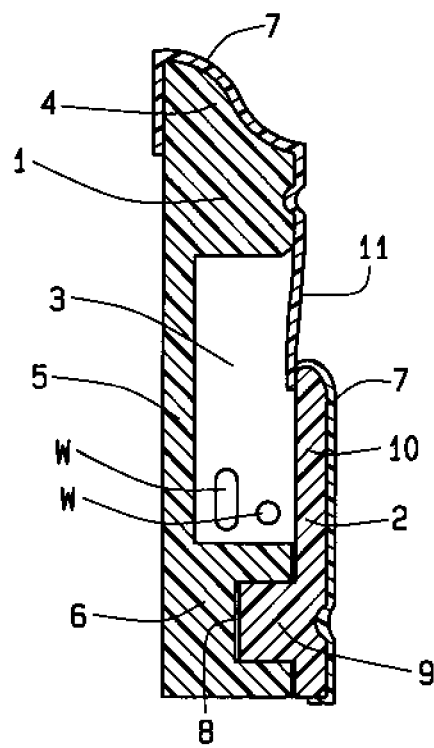
FIG. 2 describes a sectional view of the two piece embodiment of the invention.

Turning to FIG. 2, the moulding 1, shown in an end view, includes a major piece 1 that receives a minor piece 2 while providing a cavity 3 for wiring W. The drawings primarily show the moulding embodiments in an end view to emphasize their construction and details. The moulding embodiments generally have various lengths suitable for retail sale where the lengths extend outwardly from the end views. The major piece has a top portion 4 upon a stem 5 above a base portion 6. The top portion has a contoured edge in various architectural forms. The stem has a narrower width in this view than the top portion and connects the two portions. The top portion has cladding 7 that extends over it, that is away from the stem, and beneath the top portion for a length at least half way down the stem. The base portion has a keyway 8 that receives a key 9 of the minor portion. The minor piece has a tongue 10 offset from the key. The tongue also has cladding 7 tightly upon it and the tongue has a length that extends for half of the height of the cavity. The cladding of the top portion has a free end 11 that extends downwardly from the top portion to inside of the tongue 10. The free end deflects into the cavity for insertion of wire but has inherent resiliency to close back against the tongue. The cavity generally forms interiorly or within the moulding inside of the major portion, minor portion, that is, the base, top portion, and stem. A user may insert wire through the free end at any position along a piece of moulding.

FIG. 3a shows an end view of the minor portion separated from the major portion such as before assembly. The minor portion 2 has a generally thin cross section with the length of the minor portion oriented parallel to a wall S when installed. The minor portion includes the elongated tongue 10 extending upwardly from the key 9, and a stub 12 opposite the tongue and generally flush with the tongue opposite the key. The tongue generally exceeds the stub in length. The key has a generally rectangular shape that cooperates for a snug fit with the keyway 8 of the major portion. The stub has less length than the height of the key. Between the tongue and the stub and opposite the key, the minor portion has its groove 14 that extends for the length of the minor portion. The groove receives a section of the cladding 7 as shown in FIG. 2.

Then FIG. 3b shows the major portion in an end view such as before assembly. The major portion has a generally vertical stem 5, elongated with its length exceeding its width substantially. The stem has two opposite ends, 5a, 5b.

Upon one end 5a, the stem integrates with the top portion 4 proximate a corner of the top portion so that the stem is generally flush with the top portion for installation of the major portion against a wall S. The top portion has a generally rectangular cross section except for its contour, as at 16, outwardly from end 5a. The contour provides a desired finished shape for architectural and aesthetic purposes. The contour has an extended S shape as shown, however the applicant foresees various shapes for the contour, often common to moulding. The contour begins at the uppermost of the top portion and extends downwardly and inwardly to its termination at the maximum width of the top section, as at 4a. The top portion has a thickness noticeably greater than the stem. The top portion extends away from the stem and forms the upper boundary of the cavity 3. The cavity extends from the stem outwardly to the maximum width of the top section, as at 4b. The maximum width of the top section remains constant as at 4a, 4b, to fit the desired architectural shape. Though this figure shows an extend S shape upon a rectangular section, the applicant foresees other shapes of the top portion. Beneath the contour, the top portion has a height, between points 4a, 4b. Generally centered along that height, that is, between points 4a, 4b as shown, the top portion has a groove 15 outwardly from the stem. The groove 15 extends for the length of the major portion as it receives its section of the cladding 7 as shown in FIG. 2.

Opposite the contour 16 of the top portion 4, the major portion has the base portion 6 integrated from the other end 5b of the stem. The base portion has a generally rectangular shape in section and aligns with the top portion and stem to form a flush surface for the major portion as it installs against a wall S as previously shown. The base has its thickness noticeably greater than the stem 5 and generally similar to that of the top portion, as at 4a, 4b as shown. The base portion extends away from the stem in the same direction as the top portion and forms the lower boundary of the cavity 3. The cavity generally has a rectangular shape with its length oriented vertically as shown. The cavity extends from the stem 5 outwardly to the maximum width of the base portion, as at 6a. The base portion then includes the keyway 8 recessed into the base portion towards the stem. The keyway has a rectangular shape as shown that cooperates with the key 9 as previously shown. The keyway has a height approximately one half of the height of the base portion. The keyway is generally centered upon the base portion outwardly from the stem. Beneath the keyway, the base portion also has its maximum width as at 6b. The base portion generally has a flat bottom 17, that is, perpendicular to the stem, for tight placement upon a floor F. As previously shown, both the minor portion and the major portion receive sections of cladding that provides a flexible cover over the cavity and a consistent exterior appearance of the moulding when installed with the stem adjacent to a wall S.

In an alternate embodiment, the moulding has single piece construction as shown in FIG. 4. The moulding can be extruded or otherwise made into a single piece. The moulding has a back 18, generally flat, of a thin thickness, and an elongated shape. The back abuts a wall S when the moulding is installed. The back generally defines the height of the moulding subject to architectural and aesthetic purposes. The back has two opposite ends, a shoulder 19 generally away from a floor F when installed and a base 20 opposite the shoulder and proximate the floor F when installed. The base is generally perpendicular to the back and extending away from the back, generally outwardly from a wall S. Proximate the back, the base has a bevel 20a, generally at 45°, that transitions from the vertical back to the horizontal base. Opposite the bevel, the base has a toe 20b, generally rounded, proximate the floor and spaced away from the bevel. Within the bevel and the toe, the base has a flat surface 20c that abuts a floor when installed and a curved, generally concave surface 20d opposite the flat surface as shown. Upwardly from the toe, the moulding 1 has its front 21, extending upwardly from the base, generally parallel and spaced away from the back. The front has a thickness slightly more than that of the back. The front extends upwardly at least 25% of the height of the moulding. Upwardly, the front has its second portion 21a with a narrower thickness than the front 21. The second portion also extends upwardly at least 25% of the moulding's height. The front transitions to the second portion at a step 21b here shown as a gentle curve, though the applicant foresees other aesthetic shapes for the step. Upwardly from the step, the second portion 21a has a groove 14 generally curved and opposite the back. Above the groove at more spacing than between the groove and the step, the second portion has its tip 22 as the upper most portion of the front of the moulding. The tip has an angled form with the lower portion towards the front and the higher portion towards the back. The tip extends across the thickness of the second portion 21a. The tip has a height though less than that of the back.

The back also has its shoulder 19 opposite the bevel 20a of the base 20. The shoulder has a flap 23 that extends downwardly and outwardly from the shoulder, at about 45°. The flap has similar thickness at the shoulder that then tapers and narrows away from the shoulder. The flap gently curves towards the tip 22 of the front 21. The flap continues inwardly of the tip to a free end 23a. The free end has the narrowest thickness of the flap and generally extends to approximately where the tip 22 merges with the second portion 21a. The flap through its thickness, tapering, and free end has resiliency which allows an installer to push the flap inwardly and thus insert wiring W into the cavity 3 within this alternate embodiment. The front, toe, base, bevel, and back cooperate so that the moulding 1 has rigidity that resists the front cantilevering into the moulding and collapsing the cavity.

FIG. 5 shows another alternate embodiment of the invention in a section view. This embodiment has a base 24 generally flat with a thickness approximately 25% of its length. The base 24 has a thickness larger than the base 20 of FIG. 4. The base 24 defines the maximum thickness of the moulding 1. The base merges with a stem 5 that extends perpendicular to one end of the base. The stem has a thickness slightly less than that of the base. The stem extends upwardly from the base for a length more than its thickness. The stem then merges with a top portion 25. The top portion has a lower portion 25a with a maximum thickness proximate the stem and that extends perpendicular to the stem. The lower portion has a flat edge that is collinear with the stem and an opposite contour 16a. This contour gently curves inwardly and upwardly from the maximum thickness to approximately half of the height of the top portion 25. The counter 16a of the lower portion then merges with the contour 16b of an upper portion 16b. The upper portion has a maximum thickness at the junction of the two contours and then the contour 16b rises upwardly and inwardly to the top of the top portion 25 as at 26. The top, as at 26, is generally collinear with the stem 5 and defines the surface of this embodiment that abuts a wall S when installed.

Proximate the maximum width of the lower portion 25a, a slot 27 extends into the lower portion outwardly from the stem. The slot is generally thin in width and at approximately 45° towards the stem. The slot extends inwardly from where the contour 16a intersects with the flat surface of the lower portion as shown. The slot secures a flap 23. The flap has two opposite ends, a fixed end 23b and a free end 23a. The fixed end, generally thin and without a bend inserts into the slot. The flap then curves outwardly and downwardly, as in convex, but spaced away from the stem. The free end has a reverse fold inwardly for a short distance as at 23c.

Opposite the stem, the base 24 has a cover 28. The cover extends perpendicular to the stem and spaced away from the stem. The cover has its own thickness generally less than that of the stem. The cover extends upwardly for at least half of the height of the stem. The cover has its tip 29 opposite the base. The tip receives the free end 23a of the flap just inside the cover 28. More precisely, the fold of the free end extend just beneath the tip. The flap, of a resilient material bends inwardly from the slot and inwardly from the cover so that an installer may place wiring W within the cavity 3 of this embodiment. The cavity has a generally rectangular shape bounded by the base, the stem, the lower portion, and the cover.

Turning to FIG. 6, an alternate embodiment of the moulding appears in an end view. This embodiment has a base 29 having a flat bottom that abuts a floor F when installed. The base also has a thickness, generally above the floor, generally approximate to its length. The base then has two opposite ends. Proximate one end, a stem 30 extends upwardly and perpendicular to the base. The stem is generally slender with a length that exceeds its thickness and a thickness noticeably less than that of the base. Opposite the base, the stem has its tip 31. The tip is slightly longer than the thickness of the stem but has slightly less thickness than the remainder of the stem. The tip in this embodiment has a square end. Opposite the stem, a cover 32 extends upwardly from the base and generally parallel to and spaced apart from the stem. The cover has a thickness greater than that of the stem but less than that of the base. The cover has a portion of constant thickness proximate the base. Away from the constant thickness and the base, the cover has its thickness taper upon the outer surface, that is, opposite the stem. The cover reaches its narrowest thickness, as at 32a, just below the tip 31 on the stem 30 behind it. The cover and the stem have spaced apart and mutually parallel interior surfaces as shown. Fitting upon the tip, this embodiment has a flap 33 with a generally arcuate shape and two ends. Upon one end, the flap has a shoulder 34 with the largest thickness of the flap. Upon the opposite end, a free end 36 has the thinnest portion of the flap and slips inside of the narrowest portion of the cover at 32a. The shoulder though has two mutually parallel and spaced apart depending flanges 35. The flanges have an orientation at an angle to a tangent to the flap at the shoulder. The flanges fit snugly upon the tip and generally parallel the upright surfaces of the tip as shown. The remainder of the flap curves downwardly and outwardly from the flanges so that the free end 36 fits inside of the cover 32. The free end extends slightly down the length of the cover. As in other embodiments, the flap has a resilient material for its construction. Within the base, the stem, the cover, and the flap, this embodiment of the moulding has a cavity 3 of a nearly rectangular shape for receiving wiring W.

Figure 7:
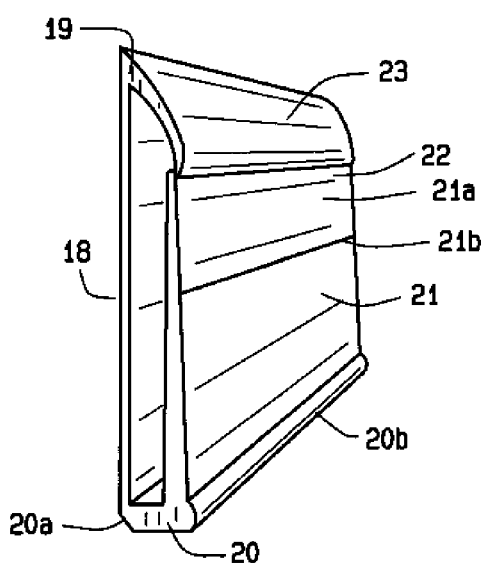
FIG. 7 shows a perspective view of the single piece embodiment.
Figure 8:
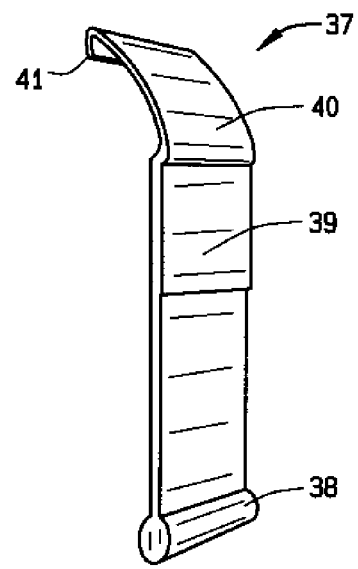
FIG. 8 shows a perspective view of a joint clip that cooperates with abutting sections of the moulding.

Having described various embodiments of moulding in their cross sections, pieces of moulding have splices, inside corners, and outside corners to follow during an installation. FIG. 7 shows a piece of moulding with the cross section shown in FIG. 4. Moulding often comes in defined lengths from suppliers, such as 4 foot, 8 foot, 10 foot, and 12 foot. However, a wall may have a length over 12 feet which calls for splicing sections of moulding. In the prior art, installers make a scarf joint by cutting the ends of abutting moulding at a 45° angle or flatter. The present invention though a splice 37 in FIG. 8 that fits over two abutting pieces of moulding in the present invention. The splice 37 has its own base 38, generally rounded similar to the toe 20b that merges upwardly into a front 39 of similar cross-section to the moulding 1. Opposite the base, the splice has a clip 40 of lesser thickness than the front as shown. The clip has an arcuate cross section similar to the flap 23. Opposite the front, the clip has an ear 41 turned downwardly from the clip and generally parallel to the front. The ear has a short length compared to the remainder of the clip. The ear slips behind the shoulders 19 of two abutting pieces of moulding. In an alternate embodiment, the splice has a two piece assembly that allows insertion of wiring through the splice much like the lengths of straight moulding. In a further alternate embodiment, the splice also includes a flap of similar design as a straight piece of moulding. In a further alternate embodiment, the splice also has its ear depending from the free end of the clip and a second clip extending from the base opposite the toe so that the ear of the clip grasps the top of the straight piece of moulding and the second clip grabs the bottom of the straight piece of moulding.

When the moulding encounters an inside corner, such as where two perpendicular walls meet, the present invention includes a connector 42 that essentially comprises two splices 37 joined perpendicularly and the clips extend outwardly. The connector has a base 43 generally rounded similar to the toe 20b and an L shape of equal length legs. The base has an L shaped front 44 extend upwardly and perpendicular to both legs of the base. The front has a lesser thickness than the base but a similar cross-section to the moulding 1. Opposite the base, the connector 42 has an L shaped clip 45 that extends away from the front and outwardly from the base. The clip also extends outwardly from the common centerline of the connector. The clip has an ear 46 depending from its free end away from the front, similar to the ear 41 of the splice. The clip has an arcuate cross section similar to the flap 23. Opposite the front, the clip has an ear 46 turned downwardly from the clip and generally parallel to a leg of the base. In use, the connector 42 fits upon two pieces of moulding meeting at a corner, generally outwardly from the wall surfaces. The ear slips behind the shoulders 19 of two abutting pieces of moulding. In an alternate embodiment, the connector has a two piece assembly that allows insertion of wiring through the connector much like the lengths of straight moulding. In a further alternate embodiment, the connector also includes a flap of similar design as a straight piece of moulding. In a further alternate embodiment, the connector has the ear depending from the free end of the clip and a second clip extending from the base opposite the toe so that the ear of the clip grasps the top of the straight piece of moulding and the second clip grabs the bottom of the straight piece of moulding.

Figure 9:
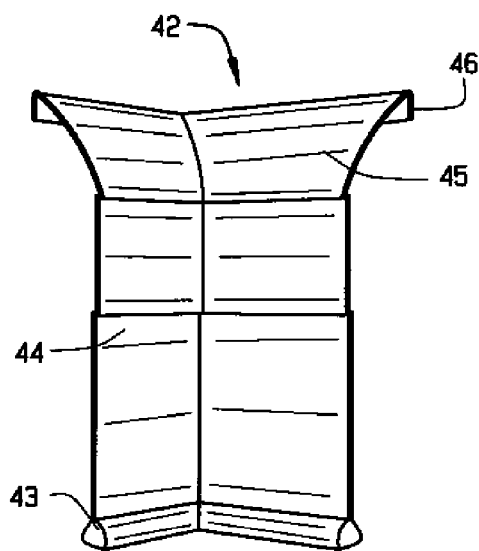
FIG. 9 provides a perspective view of an inside corner trim that cooperates with intersecting sections of the moulding; and, FIG. 10 reveals a perspective view of an outside corner trim that cooperates with intersecting sections of the moulding.
Figure 10:
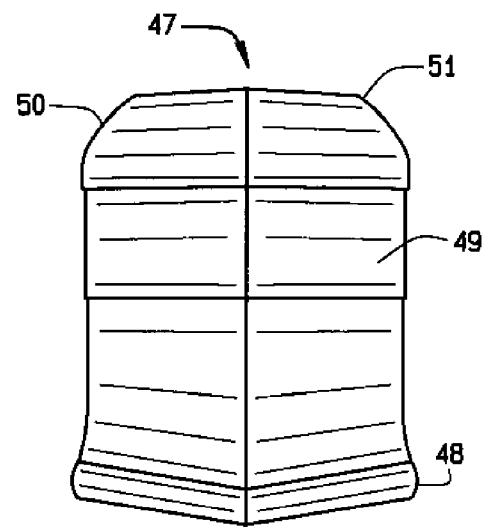

And when the moulding encounters an outside corner, such as where a wall extends into a room, the present invention includes a second connector 47 that essentially comprises two splices 37 joined perpendicularly but the clips extend inwardly. The connector has a base 48 generally rounded similar to the toe 20b and an L shape of equal length legs oriented towards each other, the mirror image of base 43. The base 48 has an L shaped front 49 extend upwardly and perpendicular to both legs of the base. The front has a lesser thickness than the base but a similar cross-section to the moulding 1. Opposite the base, the second connector 47 has an L shaped clip 50 that extends away from the front and inwardly from the base. The clip also extends inwardly from the common centerline of the second connector, opposite that of FIG. 9. The clip has an ear 51 depending from its free end away from the front, similar to the ear 41 of the splice. The clip has an arcuate cross section similar to the flap 23. In use, the second connector 47 fits upon two pieces of moulding meeting at an outside corner, generally outwardly from the wall surfaces. The ear slips behind the shoulders 19 of two abutting pieces of moulding. In an alternate embodiment, the second connector has a two piece assembly that allows insertion of wiring through the second connector much like the lengths of straight moulding. In a further alternate embodiment, the second connector also includes a flap of similar design as a straight piece of moulding. In a further alternate embodiment, the second connector too has the ear depending from the free end of the clip and a second clip extending from the base opposite the toe so that the ear of the clip grasps the top of the straight piece of moulding and the second clip grabs the bottom of the straight piece of moulding.

From the aforementioned description, moulding to conceal wiring has been described. The concealing moulding is uniquely capable of receiving wiring upon any point along its length. The concealing moulding has a resilient flap the closes a cavity that receives the wiring. The moulding to conceal wiring may be manufactured from many materials including but not limited to, wood, wood particles, vinyl, latex, polymers, nylon, polyvinyl chloride, high density polyethylene, polypropylene, ferrous and non-ferrous metals, their alloys, and composites.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A device that conceals wiring at any point upon its length, said device comprising:
   one elongated slender piece, said one piece having a cavity therein and configured to receive wiring at any position along its length;
   said elongated piece having a back, a flat base generally perpendicular to said back, and a front generally perpendicular to said base and mutually parallel to said back and spaced away from said back wherein said back and said front each have a length exceeding that of said base and form a generally rectangular cross section with a length of the rectangular cross section being generally parallel to said back;
   one resilient flap extending from said back and being spaced away from said base, said flap orienting downwardly at about 45° and towards said front, said flap having a shoulder and a free end outwardly from said shoulder, said flap having a thickness, said flap tapering in its thickness from said shoulder to said free end and curving from said shoulder to said free end, said flap having an open position with said free end placed near said shoulder and said flap having a closed position with said free end away from said shoulder, and wherein said device biases said flap in the closed position and wherein said flap and the rectangular cross section of said elongated piece cooperate for wiring to accumulate within said cavity without slipping from said flap;
   said cavity having an opening;
   said flap covering said opening wherein upon pushing said flap, said flap is adapted to receive wiring inserted therein and wherein after pushing said flap, said flap returns to covering said opening.

2. The wire concealing device of claim 1 wherein said cavity positions interiorly of said back, said base, said front, and said flap.

3. The wire concealing device of claim 2 further comprising:
   said front having a rounded toe integral with said base, said toe being spaced away from said back and away from said flap, a second portion upwardly from said toe, a groove into said second portion outwardly from said base, and a tip opposite said base;
   said flap having a shoulder joining to said back opposite said base and a free end outwardly from said shoulder, said free end extending beneath and slightly behind said tip, and said flap tapering from said shoulder towards said free end.

4. A wiring concealing device that admits wiring at any point upon its length, said device comprising:
   one elongated piece, said elongated piece having a back, a flat base generally perpendicular to said back, a front generally perpendicular to said base and mutually parallel to said back and spaced away from said back, wherein said back and said front each have a length exceeding that of said base and form a generally rectangular cross section with a length of the rectangular cross section begin generally parallel to said back;
   a flap extending from said back opposite said base, said flap being spaced away from said base, said flap orienting downwardly at about 45° and towards said front, and a cavity therein;
   said cavity having an opening therein opposite said base and a position within said back, said base, said front, and said flap;
   said flap having an open position with said free end placed near said shoulder and said flap having a closed position with said free end away from said shoulder, and wherein said device biases said flap in the closed position and wherein said flap and the rectangular cross section of said elongated piece cooperate for wiring to accumulate within said cavity without slipping from said flap;
   said flap covering said opening wherein upon pushing said flap, said flap is adapted to receive wiring therein and wherein after pushing said flap, said flap returns to covering said opening;
   said front having a rounded toe integral with said base, said toe being spaced away from said back and away from said flap, a second portion upwardly from said toe, and a tip opposite said base; and,
   said flap having a thickness and a shoulder joining to said back opposite said base and a free end outwardly from said shoulder, said free end extending beneath and slightly behind said tip, and said flap tapering in its thickness from said shoulder towards said free end and curving from said shoulder to said free end.

* * * * *